Aug. 24, 1965   L. B. MATHEWS   3,201,823
AUTOMATIC NECK SKIN CLIPPER
Filed Aug. 20, 1963   2 Sheets-Sheet 1
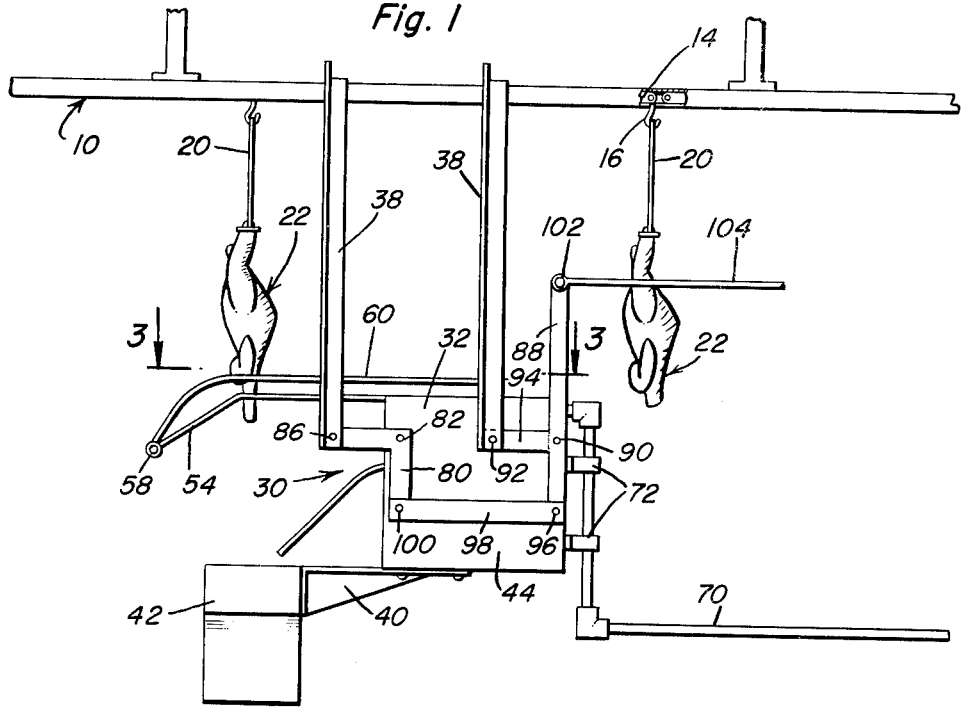
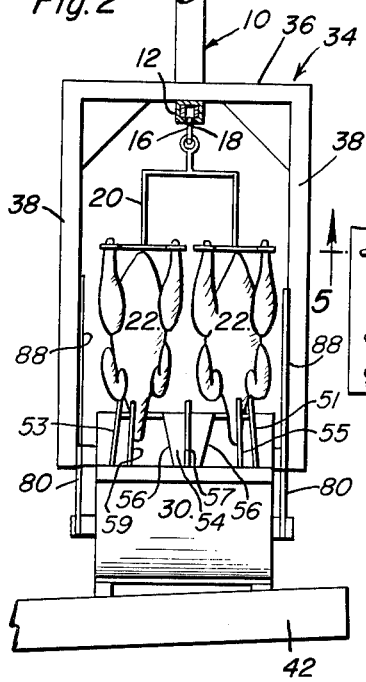
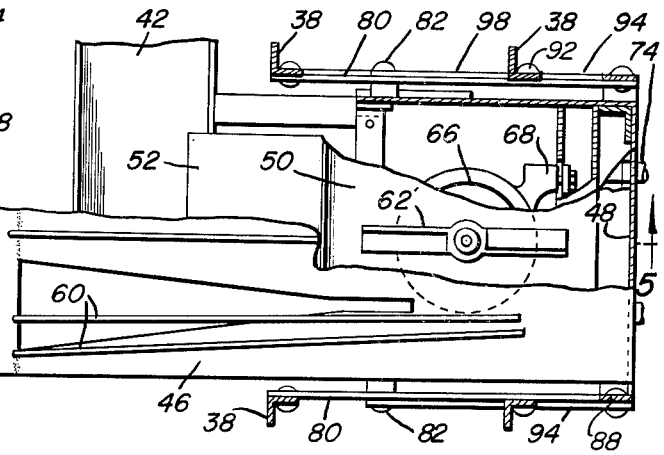
Louie B. Mathews
INVENTOR.

Aug. 24, 1965　　　　L. B. MATHEWS　　　　3,201,823
AUTOMATIC NECK SKIN CLIPPER
Filed Aug. 20, 1963　　　　　　　　　　　2 Sheets-Sheet 2
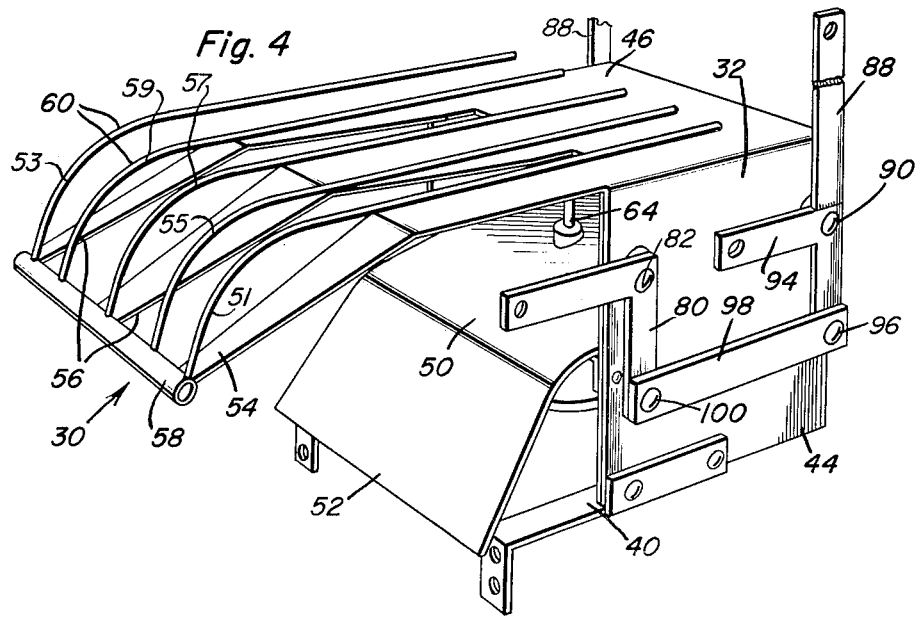
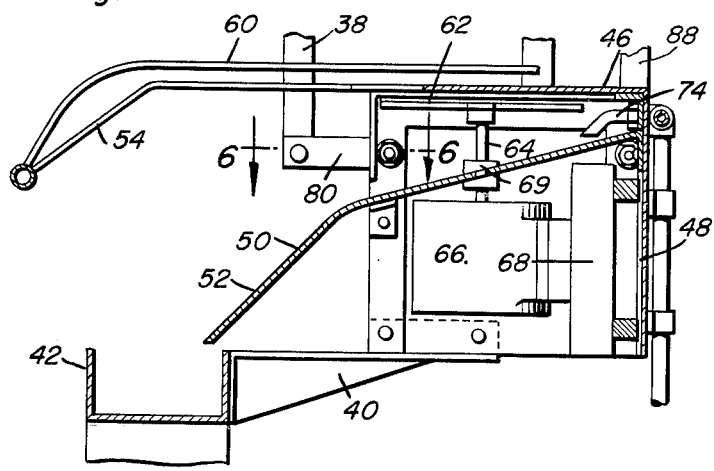
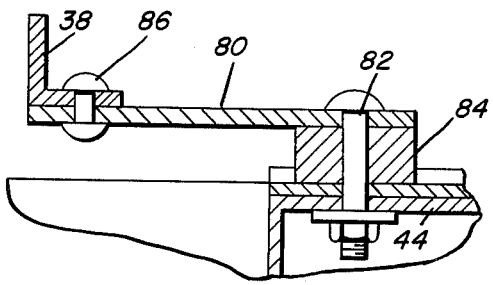
Louie B. Mathews
INVENTOR.

United States Patent Office 3,201,823
Patented Aug. 24, 1965

3,201,823
AUTOMATIC NECK SKIN CLIPPER
Louie B. Mathews, 10 2nd Ave., Pritchard, Ala.
Filed Aug. 20, 1963, Ser. No. 303,334
13 Claims. (Cl. 17—11)

This invention comprises a novel and useful automatic neck skin clipper and more particularly pertains to a device specifically adapted for use in conjunction with an overhead poultry dressing conveyor assembly for severing the strip of skin by which the severed necks of beheaded poultry remain attached to the bodies thereof.

In conventional automation systems for dressing poultry, they are carried in an inverted position, being suspended by their legs from an overhead conveyor system during transport from a loading station to a discharge station, while various poultry butchering or cleaning operations are being performed upon the continuously moving fowls. Under present day handling methods it is a requisite that after the poultry has been beheaded, the depending neck must be severed but retained upon the body by a strip of neck skin until just prior to the discharge of the dressed poultry to a chiller. It is therefore the primary purpose of this invention to provide an automatic neck skin severing means or clipper for cutting the retaining strip of skin and thus releasing the severed neck from the body of the fowl in order that the severed necks may be washed and separately collected for subsequent disposition. In the interest of economy as well as for the purpose of providing a more attractive dressed fowl, it is desirable that the severing of the retaining strip of skin shall be effected at a uniform location upon the fowls and with a sharp, clean cut to avoid all possible mutilation of the birds. It is further important that the distance between the severing means and the conveyor track shall be readily adjusted in order that the device may accommodate different sizes and types of fowls.

It is therefore the primary purpose of the invention to provide a device for severing the retaining neck skin strip and discharging the previously severed neck from the body of the fowl in an improved manner.

A further object of the invention is to provide a device which shall be capable of use with those types of conveyor systems in which the fowls are processed in multiple lines disposed in side by side relation.

Another object of the invention is to provide a device in accordance with the preceding objects enabling quick and precise adjustment of the height of the neck skin severing member relative to the conveyor assembly.

Still another object of the invention is to provide a guide means for properly orienting the poultry necks and to protect the fowl wings during the neck severing operation.

Still another purpose of the invention is to provide a device which shall be mounted directly upon the conveyor assembly support frame and wherein the height adjusting means of the device will be directly attached to and cooperate with the mounting means.

An additional object of the invention is to provide a means for performing at a single station the final severing of the neck of the poultry from the body thereof, and the washing and discharging of the completely severed necks from the severing station to a subsequent place of collection.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of a portion of a poultry dressing conveyor system to which this invention has been applied;

FIGURE 2 is an end elevational view of the present invention taken from the left side of FIGURE 1 and showing in a vertical transverse section the conveyor system of a multiple line conveyor;

FIGURE 3 is an enlarged detailed view taken in a horizontal section substantially upon the plane indicated by section line 3—3 of FIGURE 1 with portions being broken away to show more clearly the association of the severing means with the neck discharge chute and the neck guide means of the device;

FIGURE 4 is a perspective view of the device of this invention with a portion of a height adjusting lever being broken away and omitted;

FIGURE 5 is a vertical longitudinal sectional view taken substantially upon the plane indicated by section line 5—5 in FIGURE 3 and shows further details of the neck severing mechanism; and FIGURE 6 is an enlarged detailed view taken in a horizontal section substantially upon a plane indicated by section line 6—6 of FIGURE 5.

Referring first to FIGURE 1 it will be observed that the numeral 10 designates generally the supporting frame of an overhead type of poultry conveyor, which frame may include the conventional conveyor rails 12 in the form of channel members and within which is slidably received a conveyor chain 14 having hooks 16 depending from the open slot 18 at the bottom of the rail and whereby through a shackle or hanger 20 poultry 22 are suspended in an inverted position during their transportation on the conveyor assembly. As shown in FIGURE 2, the invention has been illustrated as applied to a conveyor system having a plurality of lines of poultry conveyed in side by side relation along the conveyor line from station to station for successive treatment of the poultry thereby.

Inasmuch as the precise manner of treating and dressing the poultry forms no part of the invention set forth in claims herein, a further description of this phase of the operation is deemed to be unnecessary. It suffices for a proper orientation of the present invention with respect to a poultry conveyor assembly to understand that in conventional processes of handling and dressing poultry with an overhead conveyor system, and after the poultry has been beheaded, it is a requisite that the neck of the poultry shall be severed, usually manually, but must be left attached to and retained upon the body of the poultry by a strip of neck skin until just prior to the discharge of the poultry from the conveyor assembly into a chiller of conventional type.

Indicated generally by the numeral 30, attention being particularly directed to FIGURE 4, is a device in accordance with this invention adapted to be applied to a conventional poultry conveyor system and specifically adapted for the purpose of automatically severing the retaining strip of neck skin by which the severed neck is attached to the poultry body, then separating the now completely severed neck from the body and washing and transporting the neck to a suitable destination prior to discharge of the poultry at its discharge station.

The device 30 consists of a suitable body 32 upon which is mounted guide means for engaging and properly positioning the necks of poultry, a severing means for cutting the retaining strip of neck skin by which the neck is still attached to the poultry carcass, the discharge chute by which the severed neck is removed, washed and then transported to a collection station together with means for adjustably varying the position of the body and its equipment relative to the conveyor track of the conveyor assembly.

Referring now particularly to FIGURES 1 and 2 it will be noted that the support frame 10 has connected thereto a mounting means indicated generally by the numeral 34 and by means of which the device 30 of this invention is mounted and carried by the conveyor support frame. The mounting means 34 includes suitable transversely extending upper support members as at 36 from which depend vertical supports 38 which may conveniently be of the angle iron type and from the lower ends of which is supported the body 32 as set forth hereinafter.

Secured to the under side of the body 32 as by a suitable mounting bracket 40 is a hopper, or chute 42, see also FIGURE 5, into which the severed necks of the poultry are delivered in a manner to be subsequently set forth and from which the necks thus collected are removed to a suitable destination.

Referring now specifically to FIGURES 3–5, it will be observed that the body 32 is of a hood-like or cabinet-like construction including a pair of spaced vertical side walls 44 together wtih a top wall 46, a back wall as in 48 and an open front into which extends a forwardly and downwardly inclined plate or chute 50.

As will be observed from FIGURE 5, the forward end of the chute 50 as indicated at 52 is sharply downwardly inclined to provide an apron which discharges the severed necks into the collection member 42.

The top wall 46 as previously mentioned, projects considerably forwardly of the front end of the body 32, and is provided with a series of spaced finger portions 54 providing slots 56 therebetween, the apron 52 including the finger portions 54 of the top wall 46 being angulated downwardly from the horizontal top surface of the member 46. At their forward lower ends a transverse member in the form of a rod or pipe 58 is fixedly secured to the fingers to rigidify the construction. Guide and brace means in the form of rails 60 are provided each of these rails having its rear end fixedly attached as by welding to the top wall 46 of the body adjacent the rear end of the latter and having its forward ends downwardly curving and attached to the brace rod 58. The two outer rails 51 and 53 serve as stiffening or brace members for the guide structure. The three inner rails 55, 57 and 59 constitute two pairs of guide rails for the necks of the two lines of poultry. The guide rails 55 and 59 are each disposed to overlie a slot 56 with the central, guide rails 57 overlying the central finger 54. In this manner, as shown in FIGURE 3, the central guide rail 57 is common to both pairs of guide rails, cooperating with adjacent rails 55 and 59. As the poultry is moved along the conveyor in a fixed path of travel, the depending necks of the two poultry lines will pass between the guide rails 55 and 57 and between the rails 57 and 59 and will depend through the slots 56, the rails thus preventing the wings of the fowl from passing downwardly into these slots.

Referring next to FIGURE 5 it will be seen that there is provided a severing means in the form of a rotating knife blade 62 secured to a motor shaft 64 of an electric motor 66 which latter is mounted upon a suitable support base 68 fixed to the rear wall 48 and below the chute 50 through which the shaft 64 extends, a suitable sealing means or stuffing box 69 being provided to prevent the passage of moisture through the opening receiving the motor shaft 64.

Washing fluid such as water is through a source, not shown, delivered by the pipe 70 mounted in suitable brackets 72 on the rear of the back wall 48 of the body, this water being discharged as by nozzles 74 downwardly from the upper end of the chute 50. The water serves thus to wash and lubricate the chute so that the poultry necks can readily pass downwardly there along under the influence of gravity also under the influence of the streams of water spraying from the nozzles 74, only one of which is shown, the thus washed and conveyed necks being delivered into the collection means 42.

As previously mentioned, each of the set of guide rails 60 is positioned beneath one of the poultry conveyor lines in such a manner that the depending necks of the fowls may pass between the guide rails and thus be confined to a path of travel which will cause the necks of the fowl to move into the path of travel of the severing blade 62 which will thus sever the strips of skin which retain the severed necks to the body of the fowl. It will be appreciated that a precise adjustment of the device 32 is necessary in order that the severing blade may engage the neck of the fowl at precisely the proper location for the maximum efficiency of results. Since this distance will vary with different types of fowls and different sizes of fowls, it is necessary to provide some means for adjustably positioning the severing means and the guide means with respect to the conveyor line. For this purpose there is provided an adjusting mechanism which also forms a part of the supporting or mounting means for the device. Referring now especially to FIGURES 4 and 6 in conjunction with FIGURE 1 it will be seen that the adjusting means includes a linkage arrangement which variably supports the device from the support frame members of the conveyor assembly and particularly from the lower ends of the supports 38 thereof.

Each sidewall 44 of the body 32 has a pair of levers pivoted thereto. Thus, a bell crank lever 80 is pivoted intermediate its ends at 82 to the front portions of each wall 44 by means of a spacer 84 disposed therebetween, the bell crank lever 80 being also pivoted as at 86 to the support 38.

A lever 88 is pivoted intermediate its ends at 90 to each of the side walls 44 and is pivoted at 92 by means of a lateral arm 94 to the lower end of the other of the supports 38. At its lower end, the lever is pivoted at 96 to a link 98 which in turn is pivoted at 100 to the lower end of the bell crank 80. At its uppermost end, each lever 88 is pivoted at 102 to an actuating means in the form of a rod 104 which may be manually operated if desired.

As a result of this linkage arrangement, it is evident that imparting a push or pull motion to the actuating means 104 either to the right or to the left thereof as viewed in FIGURE 1 will rock each lever 88 about its pivot 90 and simultaneously to the linkage 98 will rock the bell crank lever 80 about its pivot 82. Since these two levers are also pivoted at 92 and 86 respectively to the supports 38, this rocking movement will selectively raise or lower the device and thus precisely adjust the distance of the severing means and the guide means to or from the conveyor assembly 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In a poultry dressing conveyor assembly of the overhead type and which includes a conveyor support frame together with a conveying means by which beheaded poultry are carried in a row along a fixed path of travel and in inverted position with their severed necks dependingly attached by an uncut strip of neck skin; a support body, a neck skin severing means mounted on said body, mounting means connected to said conveyor support frame and suspendingly supporting said support body therebeneath, adjusting means operatively connected to and interposed between said conveyor support frame and said body and operable to adjustably move said body toward and from said conveyor assembly, guide means on said support body positioned for engagement with the necks of poultry carried by said conveyor assembly and confining said necks to said fixed path of travel, said mounting and adjusting means positioning said severing means to intersect said fixed path of travel and sever said poultry necks.

2. In a poultry dressing conveyor assembly of the overhead type and which includes a conveyor support frame together with a conveying means by which beheaded poultry are carried in a row along a fixed path of travel and in inverted position with their severed necks dependingly attached by an uncut strip of neck skin; a support body, a neck skin severing means mounted on said body, mounting means connected to said conveyor support frame and dependingly supporting therebeneath said support body, guide means on said support body positioned for engagement with the necks of poultry carried by said conveyor assembly and confining said necks to said fixed path of travel, said mounting means positioning said severing means to intersect said fixed path of travel and sever said poultry necks, said guide means comprising a generally horizontal member on said body and having a slot disposed beneath said conveying means and lying along said fixed path of travel, said slot having an open front end for receiving the approaching poultry necks and a closed rear end located rearwardly of said severing means in the direction of poultry travel by said conveying means, a pair of guide bars mounted upon said horizontal member and disposed thereabove in alignment with and overlying said slot along the length of the latter whereby depending poultry necks may hang downwardly between said guide bars and within said slot where they will be severed by said severing means and said guide bars will support and prevent entry of poultry wings into said slot.

3. The combination of claim 1 wherein said adjusting means comprises levers each having spaced pivoted connections to said body and to said mounting means and actuating means connected to said levers and effecting movement thereof.

4. The combination of claim 3 wherein said levers include a pair of levers to one of which said actuating means is connected and a link connecting said pair of levers for simultaneous movement by said actuating means.

5. The combination of claim 1 wherein said adjusting means comprises a pair of levers on each side of said body, each lever of a pair of levers having spaced pivotal connections to one side of said body and to said mounting means, a link pivotally connecting each lever of a pair of levers for simultaneous movement, an actuating means connected to one lever of at least one of said pairs of levers.

6. The combination of claim 5 wherein each lever has a horizontal arm and a vertical arm respectively connected to said mounting means and to said body.

7. The combination of claim 6 wherein said link is connected to the vertical arms of the associated levers and said actuating means is connected to the vertical arm of an associated lever.

8. The combination of claim 2 including an adjusting means operatively connected to and interposed between said conveyor support frame and said support body and operable to adjustably move said support body toward and from said conveying means.

9. The combination of claim 2 wherein said horizontal member and said guide bars have their front ends sloping downwardly and away from said conveying means.

10. The combination of claim 2 wherein said support body has an inclined chute underlying said horizontal member and said severing means and receiving and discharging necks severed from poultry by said severing means.

11. The combination of claim 10 including water spray means associated with said support body and positioned for discharging a cleaning fluid upon said chute for cleansing necks cut from the poultry and conveying them down said chute.

12. The combination of claim 2 wherein said support body has an inclined chute underlying said horizontal member and said severing means and receiving and discharging necks severed from poultry by said severing means, said severing means including a motor mounted in said body below said chute, a motor shaft extending through said chute and a knife blade mounted on said shaft above said chute.

13. The combination of claim 12 including fluid sealing, bearing and packing means extending through said chute and rotatably receiving said motor shaft.

References Cited by the Examiner

UNITED STATES PATENTS

| 2,874,402 | 2/59 | Boykin | 17—12 |
| 2,926,383 | 3/60 | Steck | 17—11 |
| 2,993,228 | 7/61 | Zebarth | 17—12 |

SAMUEL KOREN, *Primary Examiner.*

LUCIE H. LAUDENSLAGER, *Examiner.*